(12) United States Patent
D'Agostino

(10) Patent No.: US 6,460,736 B1
(45) Date of Patent: Oct. 8, 2002

(54) HEATED CONFECTIONARY DISPENSER

(76) Inventor: Monica Anne D'Agostino, 185 Main St. North, Waterdown Ontario (CA), L0R 2H0

( * ) Notice: Subject to any disclaimer, the term of this patent is extended or adjusted under 35 U.S.C. 154(b) by 0 days.

(21) Appl. No.: 09/722,414

(22) Filed: Nov. 28, 2000

(51) Int. Cl.$^7$ .................................................. B67D 5/62
(52) U.S. Cl. ..................... 222/146.5; 222/327; 222/391; 222/568; 426/383
(58) Field of Search ............................. 222/146.5, 327, 222/387, 391, 568; 118/13; 426/383, 307, 306

(56) References Cited

U.S. PATENT DOCUMENTS

| | | | |
|---|---|---|---|
| 4,033,484 A | * 6/1977 | Ornsteen | 222/146.5 |
| 4,094,446 A | 6/1978 | Brutsman | 222/146 |
| 4,147,927 A | 4/1979 | Pirotte | 219/541 |
| 4,343,988 A | 8/1982 | Roller et al. | 219/302 |
| 4,493,972 A | 1/1985 | Steinel et al. | 219/230 |
| 4,523,705 A | 6/1985 | Belanger et al. | 226/127 |
| 4,526,300 A | 7/1985 | Woody | 222/146.5 |
| 4,637,745 A | 1/1987 | Speisebecher et al. | 401/1 |
| 4,781,482 A | 11/1988 | Ursprung | 401/1 |
| 4,921,130 A | 5/1990 | Hollberg | 222/46 |
| 4,941,597 A | 7/1990 | Lopez et al. | 222/146.5 |
| 4,949,881 A | 8/1990 | Watanabe et al. | 222/113 |
| 4,960,024 A | 10/1990 | Holcomb | 83/423 |
| D315,083 S | 3/1991 | Anderson et al. | D7/670 |
| 5,026,187 A | 6/1991 | Belanger et al. | 401/1 |
| 5,026,188 A | 6/1991 | Capodieci | 401/1 |
| 5,040,700 A | 8/1991 | Compton | 222/146.5 |
| 5,215,230 A | 6/1993 | Lee | 222/336 |
| 5,361,946 A | * 11/1994 | Ginther et al. | 222/175 |
| 5,421,663 A | 6/1995 | Bravo | 401/82 |
| 5,467,899 A | 11/1995 | Miller | 222/309 |
| 5,553,758 A | * 9/1996 | Melendy et al. | 222/533 |
| D388,287 S | 12/1997 | Malinosky et al. | D7/670 |
| 5,704,550 A | 1/1998 | Foster et al. | 239/333 |
| 5,881,923 A | 3/1999 | Bokros | 222/146.5 |
| 5,881,924 A | 3/1999 | Bokros | 222/146.5 |
| 5,909,830 A | 6/1999 | Bates et al. | 222/327 |
| 5,934,521 A | 8/1999 | Yamada et al. | 222/504 |
| 5,955,114 A | 9/1999 | Llanos | 425/87 |
| 5,964,380 A | 10/1999 | Hazzard et al. | 222/309 |
| 5,988,445 A | 11/1999 | Massena | 222/146.5 |
| 5,988,452 A | 11/1999 | Dent et al. | 222/309 |
| 5,992,687 A | 11/1999 | Hinds et al. | 222/1 |
| 6,000,582 A | 12/1999 | Forstmann | 222/327 |
| 6,003,733 A | 12/1999 | Wheeler | 222/146.5 |
| 6,026,985 A | 2/2000 | Elliott, Sr. | 222/1 |
| 6,047,858 A | 4/2000 | Romer | 222/1 |
| 6,054,157 A | 4/2000 | Shapiro et al. | 426/111 |
| 6,056,155 A | 5/2000 | Byerly et al. | 222/1 |
| 6,056,512 A | 5/2000 | Amberg et al. | 417/205 |
| 6,065,888 A | 5/2000 | Maayeh | 401/1 |

\* cited by examiner

Primary Examiner—Lesley D. Morris
Assistant Examiner—Patrick Buechner
(74) Attorney, Agent, or Firm—Nancy E. Hill; Hill & Schumacher (57) ABSTRACT

A confectionary dispenser of the present invention is for use in association with a confectionary. The dispenser includes a body, a movable trigger, a removable internal channel and a feeder mechanism. The trigger is movably attached to the body and has an at rest position and an end of stroke position. The removable internal channel is removably attached to the body. The removable internal channel has an exit opening and is adapted to receive the confectionary. The feeder mechanism is operably attached to the trigger for operably advancing the confectionary into the removable internal channel when the trigger is moved from the at rest position towards the end of stroke position. The confectionary dispenser may include a device for controlling the confectionary that is extruded from the channel at the exit opening. Preferably the confectionary dispenser includes a heater attached to the body which is adapted to heat the confectionary in the removable internal channel. The device may be adapted for use in association with a confectionary stick. Alternatively the device may be adapted for use in association with a confectionary cartridge.

13 Claims, 12 Drawing Sheets

HEATED CONFECTIONARY DISPENSER

FIELD OF THE INVENTION

This invention relates to heated dispensers and in particular to hand held heated dispensers for use with chocolate products and other confectionaries.

BACKGROUND OF THE INVENTION

The desire to decorate a cake, gingerbread house or other such dessert is probably as old as the desserts themselves. Accordingly a variety of devices have been developed to facilitate such decorating.

The most common and probably one of the oldest devices is the manual pastry bag. While it is simple to use, the manual pastry bag has a number of disadvantages. For example, icing or other products such as chocolate must be prepared first, then inserted into a bag portion. It can be operated only intermittently since it must be refilled at intervals. It is messy from filling, refilling and operation due to back flow. It requires a degree of manual dexterity in order to extrude the proper amount of material from the nozzle. The operator may experience fatigue with continual use and the material being extruded tends to change its viscosity due to changes in temperature and drying out of materials. The operator may also experience frustration since the use of different colours or flavours of the material requires preparing and inserting the new material in a new bag. If left overnight, the pastry bag may freeze up and typically the contents of the bag or bags must be thrown out.

The above factors minimize the desire for the average person to participate in the decorating of confections or baked goods. Generally time is the main factor limiting and restricting home use of the manual pastry bag.

There are other devices besides the pastry bag on the market to aid the decorator such as: mixed/packaged icing, ready to use spreadable icing or ready to use icing tubes. Most of theses methods are still a two step method involving time, skill and cleanup. Further using the ready to use icing tubes can be expensive since not only does the user have to purchase each icing tube but also the user must purchase every colour and tip separately.

The traditional methods of decorating with chocolate are spreading it, dipping it and cutting it out, as well as melting it and putting it in a pastry bag and manually squeezing the chocolate out. The latter method is the same manual method traditionally used for icing. Therefore, the same disadvantages as discussed above in regard to icing would apply when using chocolate.

Currently on the market there is another relatively new product for decorating called the Candy Writer™. This product is manufactured by COUNTRY KITCHEN, in Ft. Wayne 46825. This item is available in tubes with screw off tops. Prior to use, the user must place the tube in hot but not boiling water, turn it and knead it to ensure total melting. The tube of confection is not at all pliable at time of purchase. The ingredient list for this product includes: Sugar, Fractionated Palm Oil, Non Fat Dry Milk, Dry Whole Milk, Glycerylacto, Esters of Fatty Acids, Lecithin (an Emulsifier), Salt, also may contain Vanillin, and Artificial Colours and Flavours. Accordingly, the use of this product is very unpredictable and hard to control.

Also on the market is the FUN GUN™ which is a manual decorating apparatus, whereby a user still must insert prepared icing into a cylinder. This device has some advantages over the traditional method of decorating in that the user may have more control. However, this product has similar disadvantages as those associated with the traditional pastry bag method, such as messiness, mulit-step process and no appreciable time savings.

Accordingly, it would be advantageous to provide a confectionary dispenser that is easy to use, can easily be used with multiple confectionaries without a lengthy cleaning process therebetween and wherein unused confectionary need not be wasted.

SUMMARY OF THE INVENTION

The object of the present invention is to provide a one step, hand-held, time saving decorating confectionary dispenser for decorating bakery and/or confectionary goods, which is relatively inexpensive to manufacture, durable in structure and efficient in operation for in-home use. Interchangeable conventional nozzle tips can be substituted so as to provide an appropriate configuration or design for the stream of the material which is being emitted from the nozzle portion when the trigger is pulled.

A further object is to provide a confectionary dispenser that can be easily disassembled and reassembled to facilitate cleaning.

A confectionary dispenser for use in association with a confectionary is disclosed. The dispenser includes a body, a movable trigger, a removable internal channel and a feeder mechanism. The trigger is movably attached to the body and has an at rest position and an end of stroke position. The removable internal channel is removably attached to the body. The removable internal channel has an exit opening and is adapted to receive the confectionary. The feeder mechanism is operably attached to the trigger for operably advancing the confectionary into the removable internal channel when the trigger is moved from the at rest position towards the end of stroke position. The confectionary dispenser may include a device for controlling the confectionary that is extruded from the channel at the exit opening. Preferably the confectionary dispenser includes a heater attached to the body which is adapted to heat the confectionary in the removable internal channel. The device may be adapted for use in association with a confectionary stick. Alternatively the device may be adapted for use in association with a confectionary cartridge.

In another aspect of the invention a confectionary cartridge is disclosed. The confectionary cartridge includes side walls, a top, a base, a seal and confectionary. The top has an exit opening formed therein. The base is slidably attached to the side walls wherein the base is slidable towards the exit opening such that the base, side walls and top create an internal volume. The seal is releasably attached to the exit opening. The confectionary is in the internal volume. A variety of confectionary mixtures are disclosed for use in association with the confectionary cartridge.

In a further aspect of the invention a confectionary stick is disclosed. The confectionary stick is for use in association with the confectionary dispenser. The confectionary stick has an elongate stick shape at standard temperature and pressure and a melting point of generally between 38° C. and 40° C. The confectionary is a generally 1:1 mixture of A and B wherein A is rolled fondant and B is a confectionary coating. The confectionary coating may be a chocolate confectionary coating.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
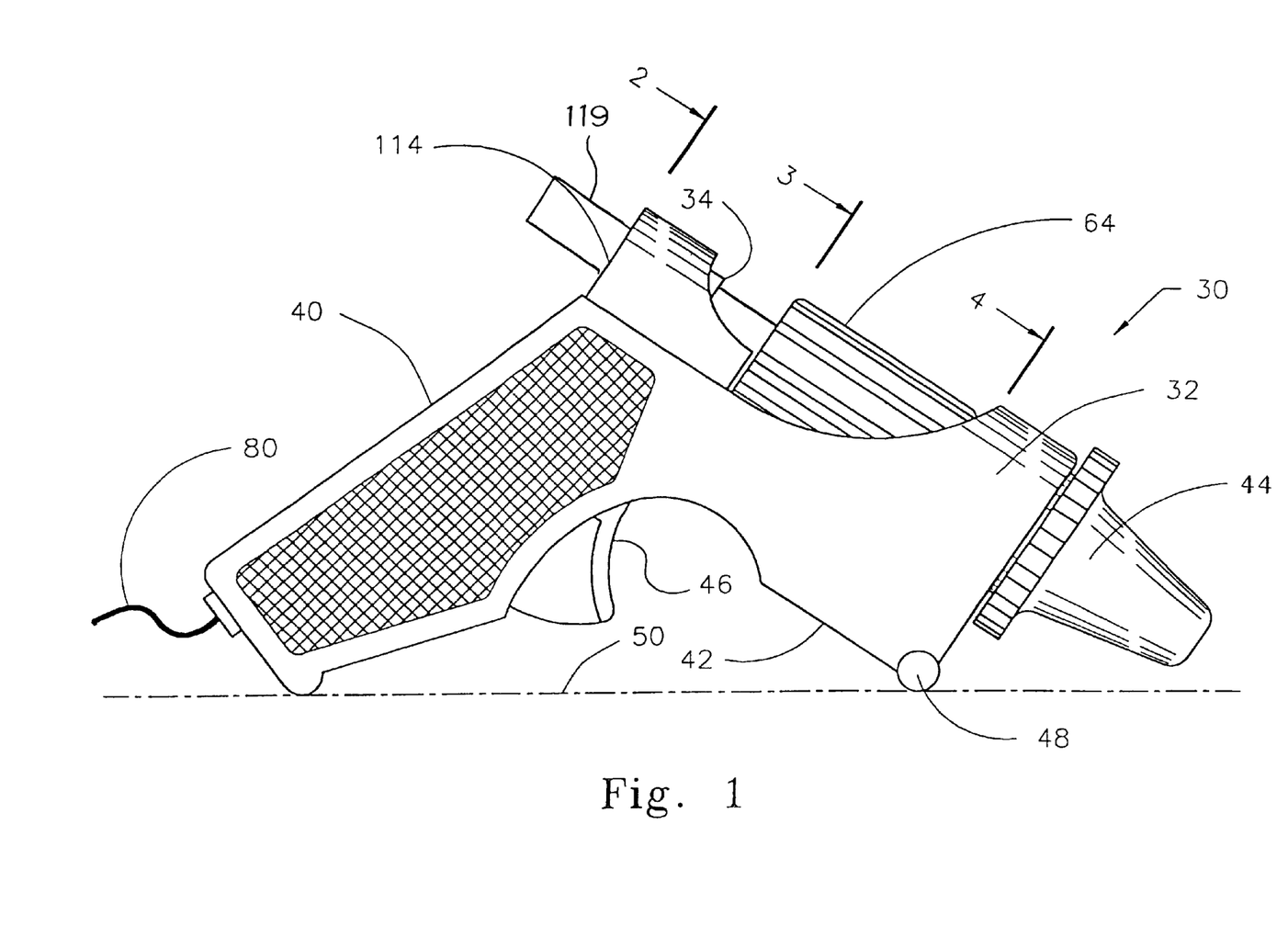
FIG. 1 is a side view of a heated confectionary dispenser of the present invention.
Figure 5:
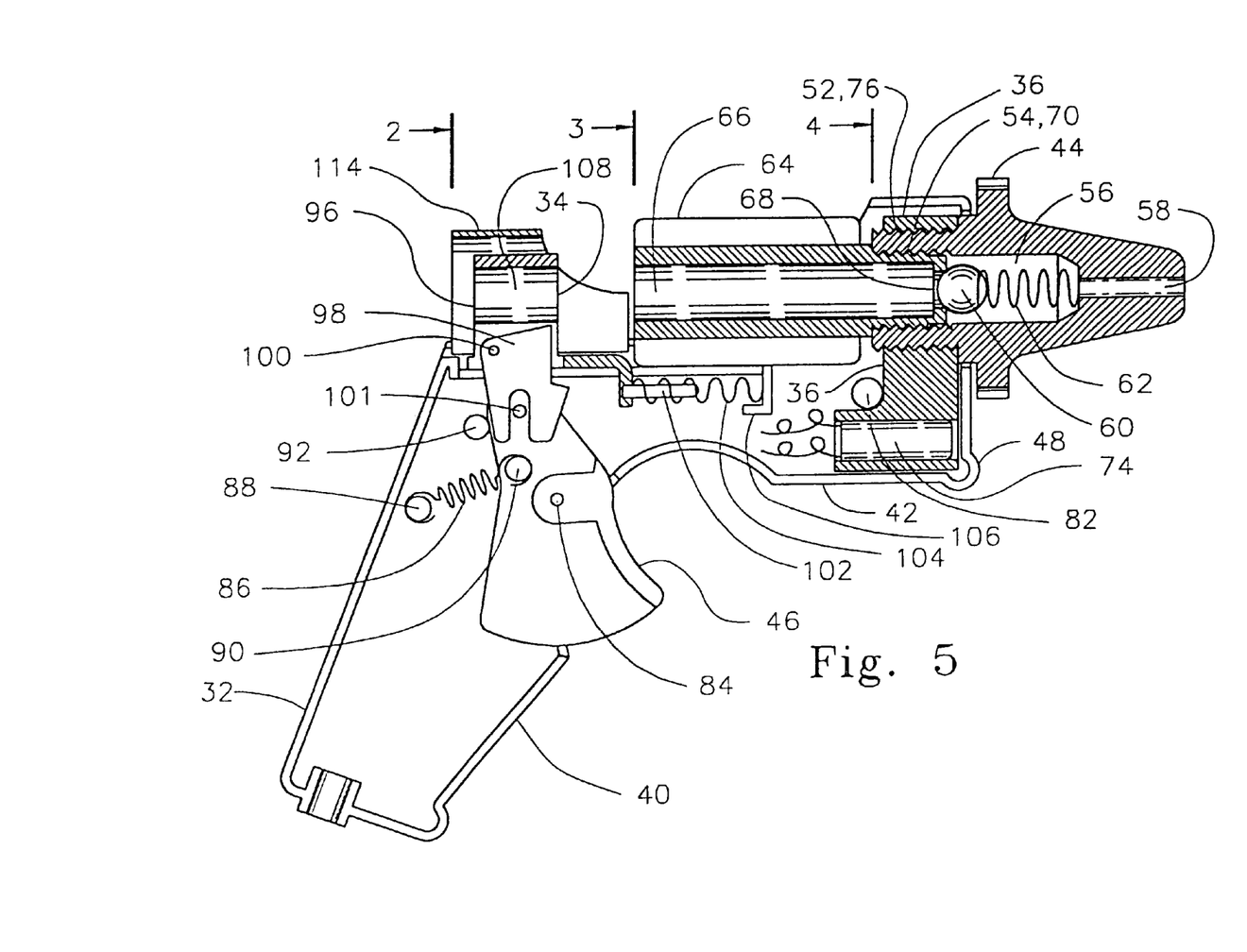
FIG. 5 is a sectional view of the heated confectionary dispenser taken along the longitudinal axis of the dispenser shown in FIG. 1.

Referring to FIGS. 1 and 5, the heated confectionary dispenser of the present invention is shown generally at 30. Dispenser 30 includes a body 32, a feeder mechanism 34 and a heater 36 (as best seen in FIG. 5).

Referring to FIGS. 1 through 6, body 32 includes a handle portion 40, a barrel housing 42, a tip 44 and a trigger 46. The feeder mechanism 34 is mounted in the barrel housing 42. The trigger 46 is operably connected to the feeder mechanism 34. Preferably the handle portion 40 and barrel housing 42 are integrally attached. The handle portion 40 and barrel housing 42 may be an injection moulded plastic body that is assembled from two mating "clamshell" halves. A stand 48 extends outwardly from both sides of the barrel housing 42 at the tip end thereof such that when the body 32 is placed on a flat surface 50 the tip 44 is spaced above the flat surface 50. Stand 48 also provides stability such that dispenser 30 will not tip over sideways.

Figure 6:
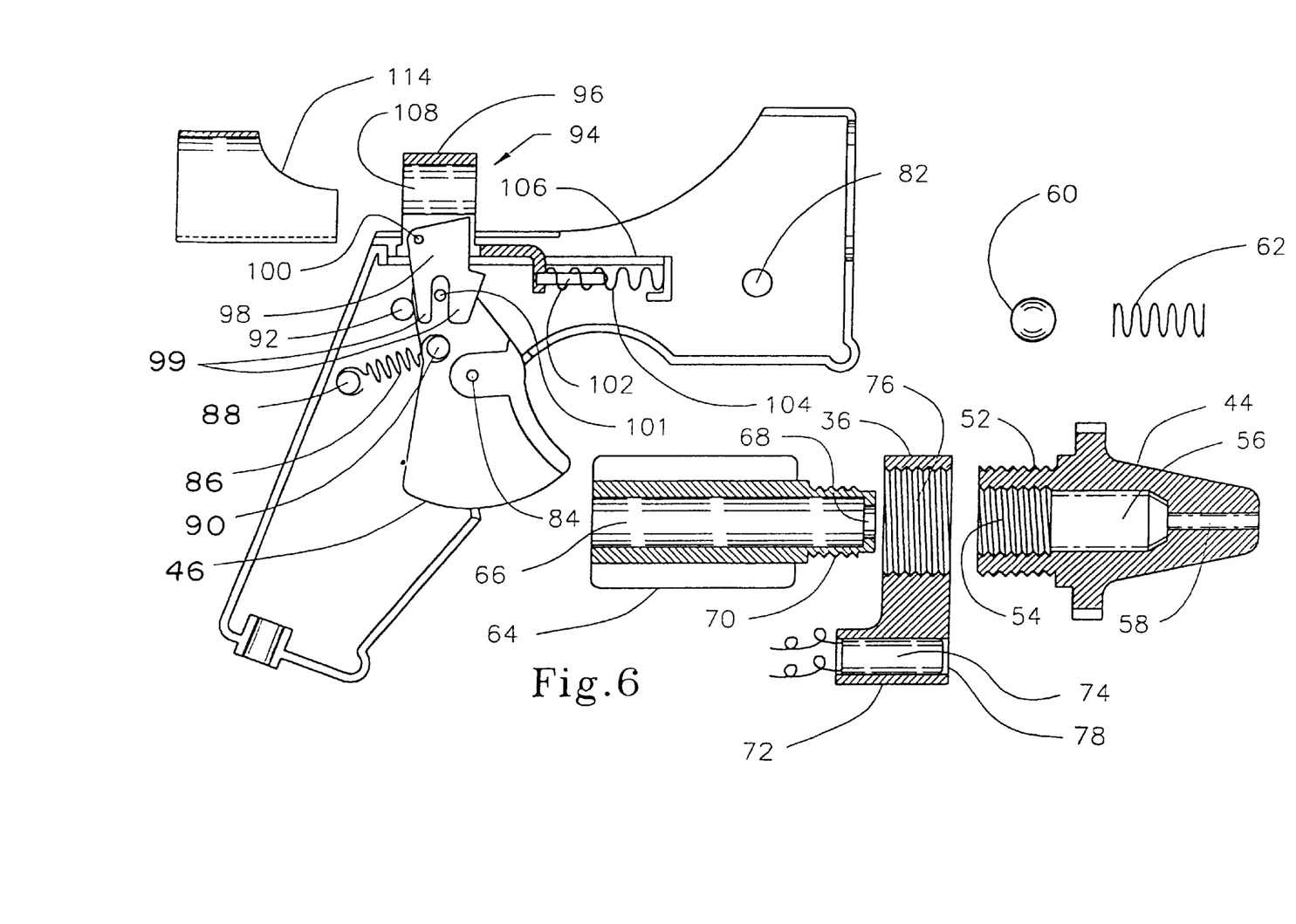
FIG. 6 is an exploded section view of the heated confectionary dispenser.

Tip 44 is removable and replaceable. Dispenser 30 may be provided with a number of different tips 44 each with a different exit opening so that the pattern of the confectionary may be changed by changing the tip 44. Tip 44 is provided with external threading 52 and internal threading 54, as best seen in FIGS. 5 and 6. Tip 44 has an internal channel 56 and an exit opening 58 in flow communication therewith. A ball 60 and compression spring 62 are positioned in internal channel 56.

A removable barrel 64 is positioned in the barrel housing 42. The removable barrel 64 has an elongate internal channel 66. Removable barrel 64 is a heat sink. It may be made from high-density, heat-resistant, low thermal conductivity plastic. Elongate internal channel 66 has an exit opening 68 that has a smaller diameter. Removable barrel 64 has external threading 70 at the exit end thereof that engages the internal threading 54 on the tip 44. When assembled, ball 60 rests against exit opening 68 and compression spring 62 biases the ball into the closed position. Ball 60 and spring 62 create a valve which opens and closes exit opening 68.

Heater 36 includes a heater body 72 and a heater element 74. The heater body 72 has an internal threaded portion 76 for engaging the external threading 52 of tip 44. Heater body 72 has a cavity 78 for receiving heater element 74. Heater element may be an electric cartridge heater that is press fitted into cavity 78. Heater element 74 is electrically connected to electric cord 80 shown in FIG. 1. A positioning pin 82 extends between the two mating "clamshell" halves of body 32 and holds heater 36 in position.

Feeder mechanism 34 and the use thereof is best seen in FIGS. 5 through 10. Feeder mechanism includes trigger 46 and feeder/gripper assembly 94. Trigger 46 is pivotally attached to body 32 with pivot pin 84. A tension spring 86 biases trigger 46 into the at rest position. Spring 86 is held in position with handle post 88 and trigger post 90. In the at rest position trigger 46 rests against at rest post 92.

Figure 2:
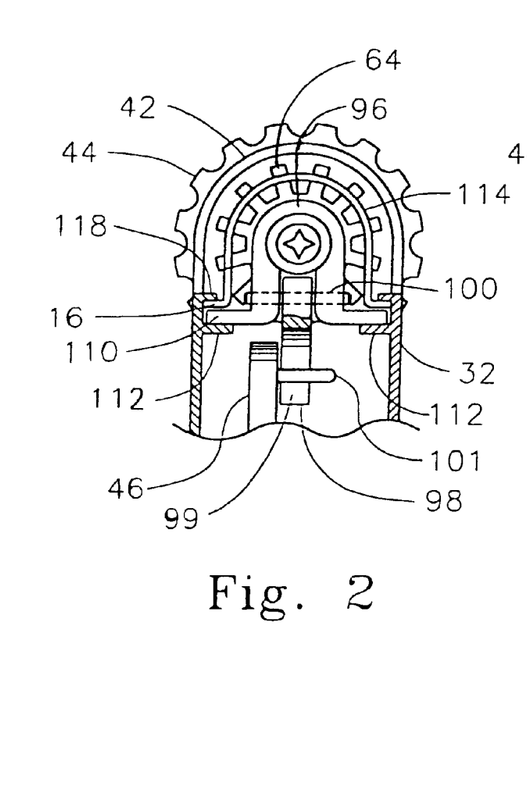
FIG. 2 is a partial sectional view of the heated confectionary dispenser at plane 2 of FIG. 1.
Figure 3:
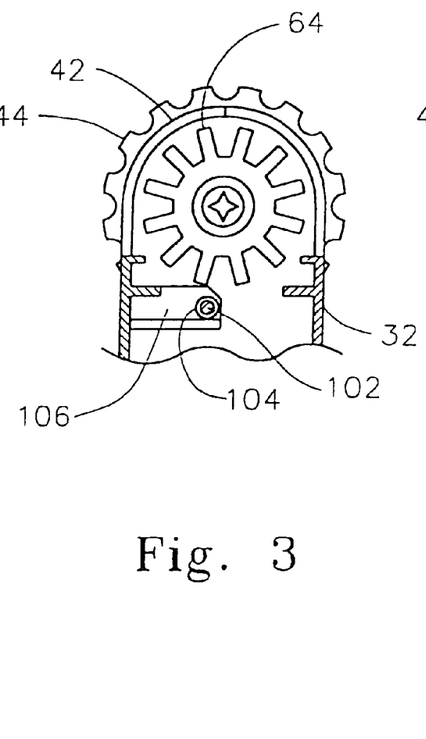
FIG. 3 is a partial sectional view of the heated confectionary dispenser at plane 3 of FIG. 1.
Figure 4:
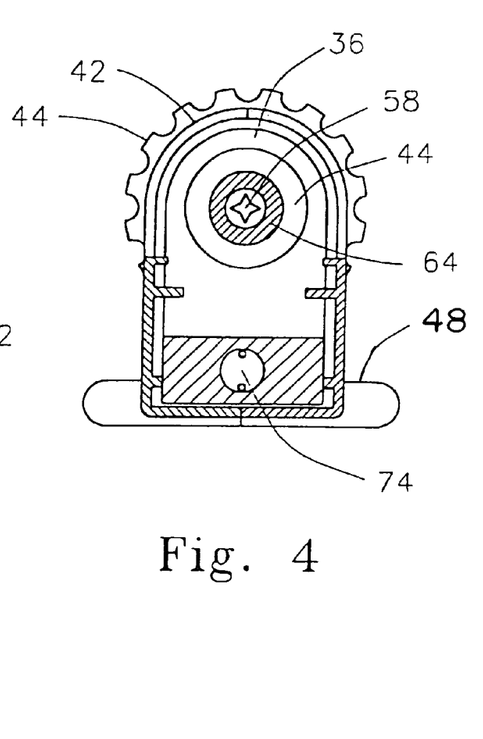
FIG. 4 is a sectional view of the heated confectionary dispenser at plane 4 of FIG. 1.
Figures 7, 8, 9, 10:
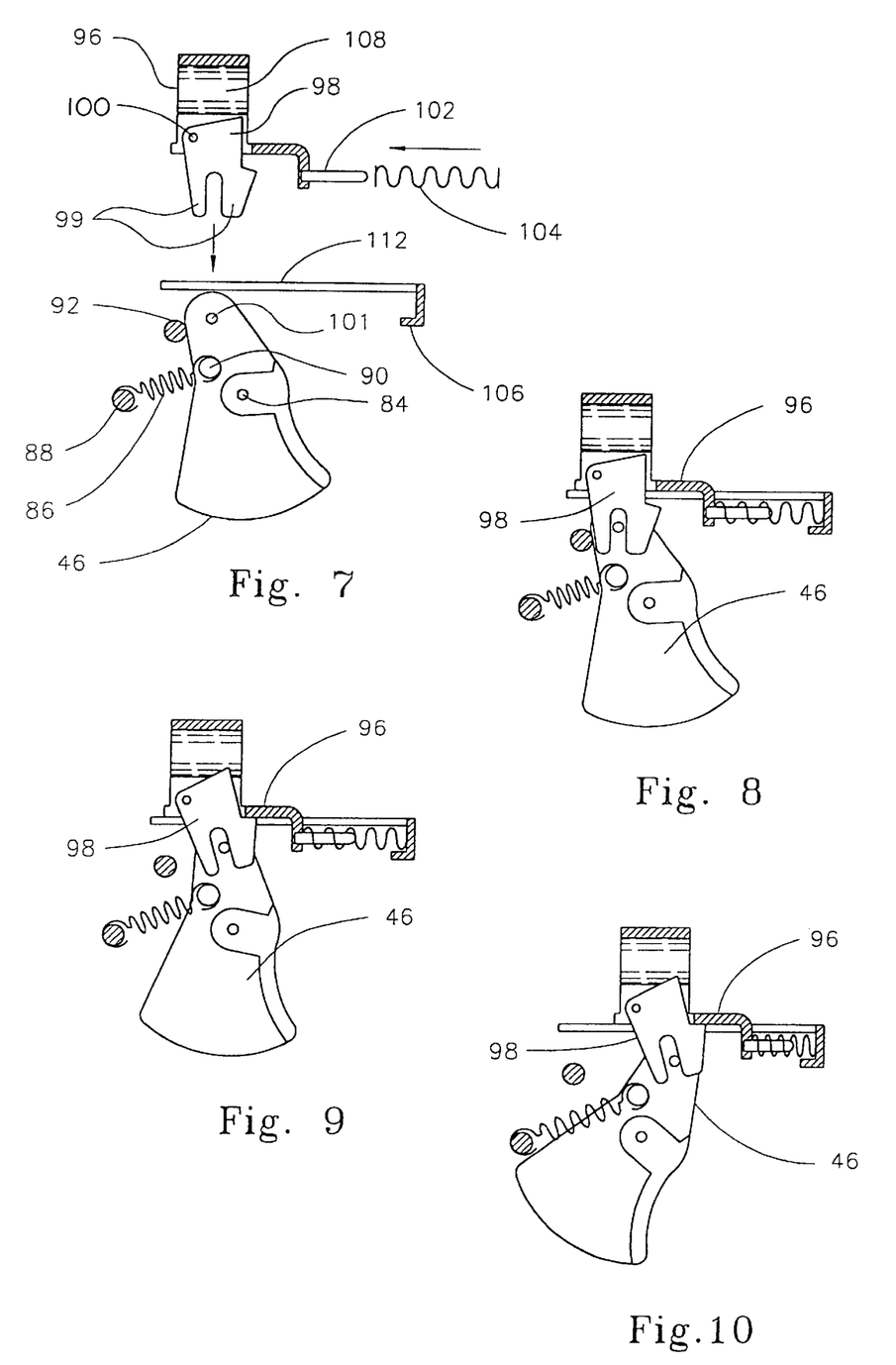
FIG. 7 is an exploded sectional view of the feeder mechanism.
FIG. 8 is a sectional view of the feeder mechanism in the at rest position.
FIG. 9 is a sectional view of the feeder mechanism in the engaged position.
FIG. 10 is a sectional view of the feeder mechanism in the end position.

Feeder/gripper assembly 94 includes a sliding feeder/gripper 96 and a claw 98 attached thereto with a claw pivot pin 100. Claw 98 has a pair of fingers 99 which extend downwardly over a pin 101 which extends outwardly from trigger 46. Extending from the sliding feeder/gripper 96 is a pin 102 which engages a compression spring 104. Compression spring 104 is held in position by a spring pocket 106 formed in body 32. Feeder/gripper 96 has an internal channel 108 which when assembled aligns with elongate internal channel 66 of removable barrel 64. Feeder/gripper 96 has a pair of side arms 110 which extend outwardly therefrom and when assembled slide on slide rail 112 which is formed in body 32, as best seen in FIG. 2.

A feeder/gripper retaining cover 114 slides onto the back of barrel housing 42. Feeder/gripper retaining cover 114 is generally an upside down "U" shape with a pair of side arms 116 that rest on the side arms 110 of the feeder/gripper 96 and are held in place by retaining rails 118.

In use a confectionary stick 119 as shown in FIG. 1, which has an elongate rod shape at standard temperature and pressure, is inserted into the back of dispenser 30 and into the feeder/gripper assembly 94. The user would then squeeze the trigger 46 as shown in FIGS. 8 through 10. This would cause the feeder gripper assembly 94 to move forwardly and claw 98 to pivot upwardly and engage the confectionary stick. The feeder/gripper assembly 94 continues to move forwardly to the end of the stroke. Trigger 46 is then released which causes claw 98 to disengage the confectionary stick and allows the springs to move the trigger back into the at rest position. When the confectionary stick enters the heater 36 the confectionary stick partially melts so that it can readily be pushed through tip 44. As the confectionary stick is pushed through elongate internal channel it is heated by heater 36. Molten confectionary is then pushed through exit opening 68 forcing ball 60 to move forwardly and compress compression spring 62. Molten confectionary will also be pushed out of tip 44 through exit opening 58. When confectionary is no longer being pushed forwardly the compression spring 62 will move the ball 60 backwardly to seal exit opening 68. Trigger 46 is squeezed as needed to force confectionary through tip 44. As discussed above tip 44 can have a variety of different opening patterns to produce different looks for the confectionary.

Confectionary dispenser 30 can be easily assembled and disassembled to facilitate cleaning. Feeder/gripper retaining cover 114 is slide back off body 32. Feeder/gripper assembly 94 is lifted off trigger 46. Removable barrel 64 is unscrewed and removed. Tip 44 is unscrewed and removed. Ball 60 and compression spring 62 are removed from tip 44. The process is reversed to assemble confectionary dispenser 30.

An alternate embodiment is shown in FIGS. 11 through 18 wherein the confectionary dispenser 130 is adapted to be used with a confectionary cartridge rather than a confectionary stick. Many of the elements described above with regard to dispenser 30 are the same as those in dispenser 130. Dispenser 130 includes a body 132, a feeder mechanism 134 and a heater 135. The principle difference between dispenser 30 and dispenser 130 is the feeder mechanism. Hereinafter where applicable the elements of dispenser 130 that are the same as the elements of dispenser 30 will be given the same reference number and will not be discussed in detail.

Figure 11:
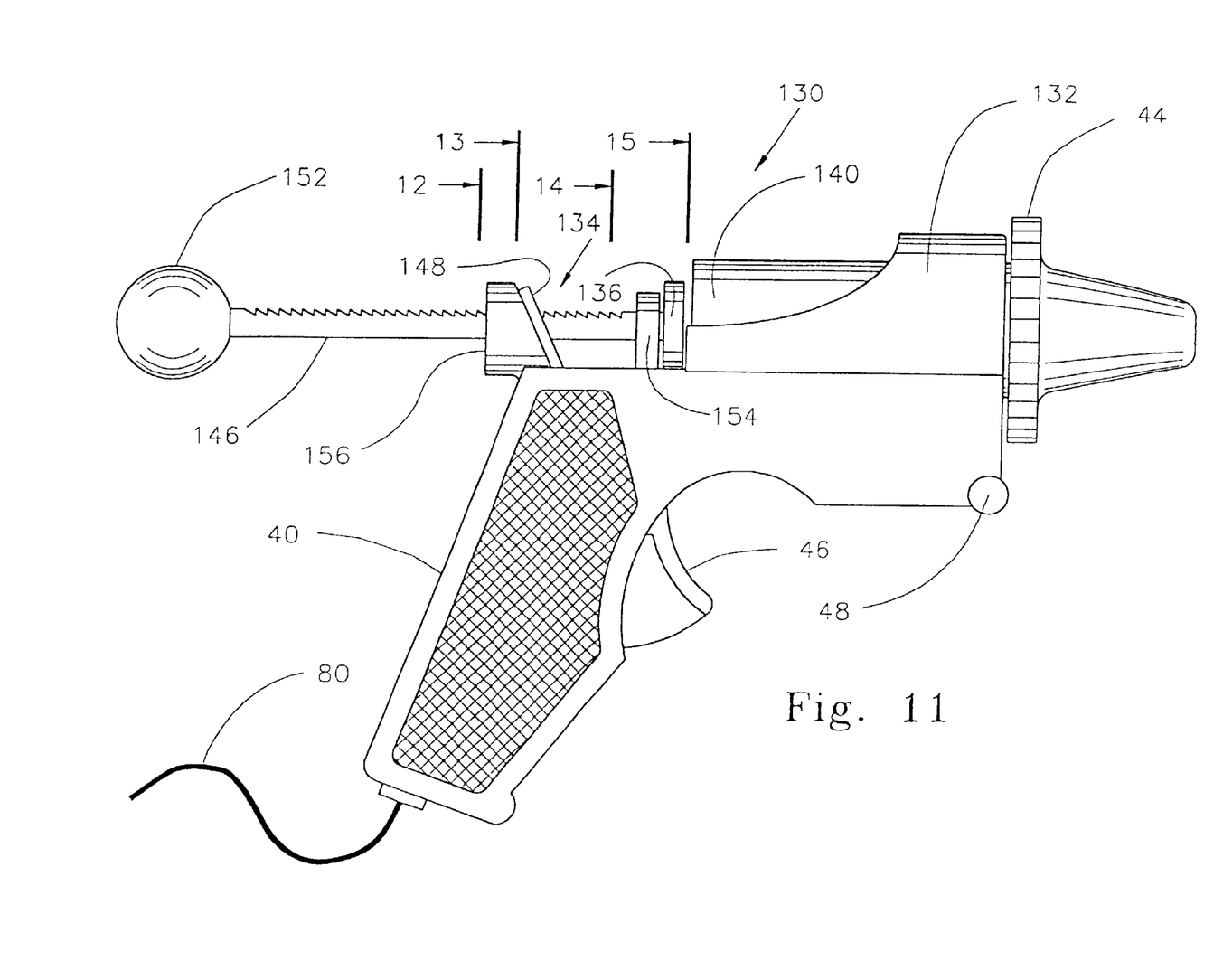
FIG. 11 is a side view of an alternate embodiment of a heated confectionary dispenser of the present invention.
Figure 12:
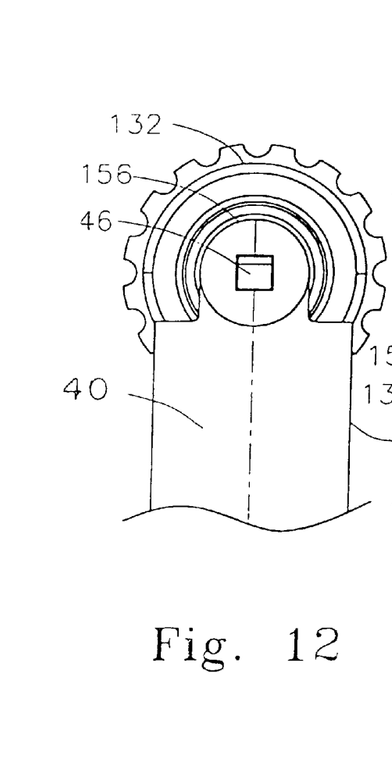
FIG. 12 is a sectional view of the heated confectionary dispenser shown in FIG. 11 at plane 12.
Figures 13, 14, 15:
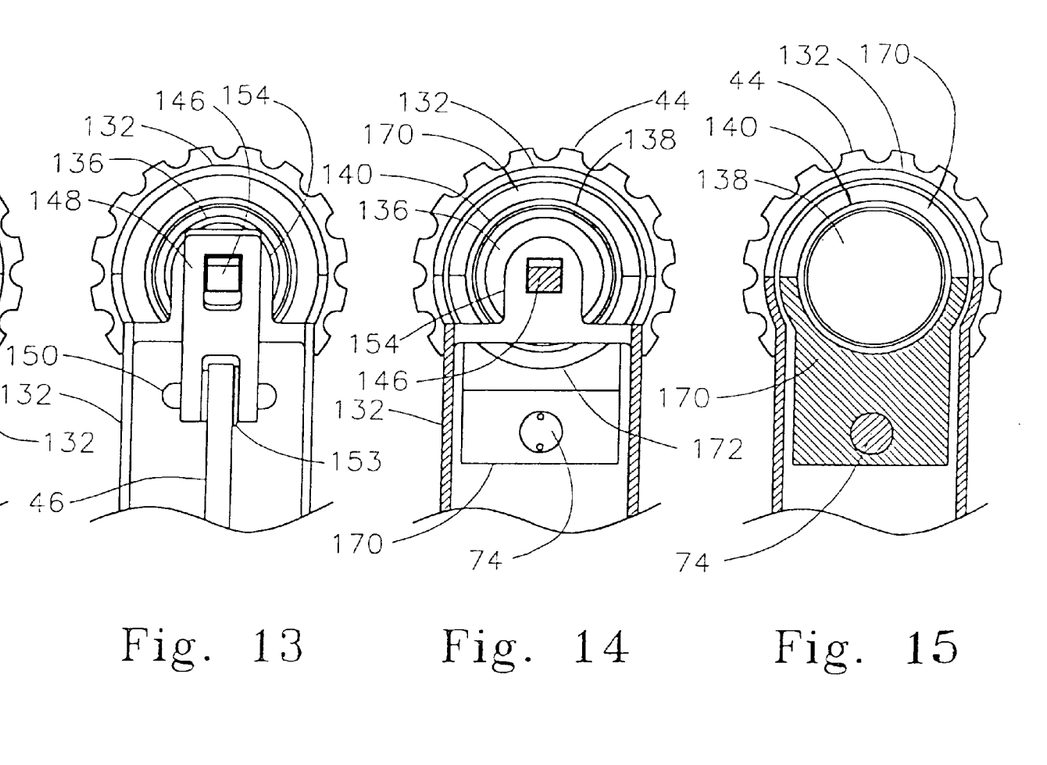
FIG. 13 is a sectional view of the heated confectionary dispenser shown in FIG. 11 at plane 13.
FIG. 14 is a sectional view of the heated confectionary dispenser shown in FIG. 11 at plane 14.
FIG. 15 is a sectional view of the heated confectionary dispenser shown in FIG. 11 at plane 15.

Feeder mechanism 134 includes a ratchet type mechanism for advancing a plunger 136 into the movable base 138 of the confectionary cartridge 140. Confectionary cartridge 140 has a moveable base that is slideable along the side walls 142 of cartridge 140 while maintaining a seal therebetween. Cartridge 140 has a top 143 with an exit opening 144 formed therein. The movable base 138, side walls 142 and top 143 create an internal volume 145. Confectionary is placed in the internal volume 145. Movement of the movable base 138 towards the top 143 causes the confectionary to be pushed through the exit opening 144.

Ratchet feeder mechanism 134 includes an elongate ratchet bar 146 and a pawl 148. Pawl 148 is pivotally attached to trigger 46 with pivot stud 150. Plunger 136 is attached to the front end of elongate ratchet bar 146. A knob 152 is attached to the back end of elongate ratchet bar 146. A rotary spring 153 biases the pawl 148 into engagement with the elongate ratchet bar 146. Rotary spring 153 biases pawl 148 such that exterior corner 190 of aperture 192 in pawl 148 is in contact with some part of the ramp 194 of a tooth 196 on the ratchet bar 146.

Figure 21:
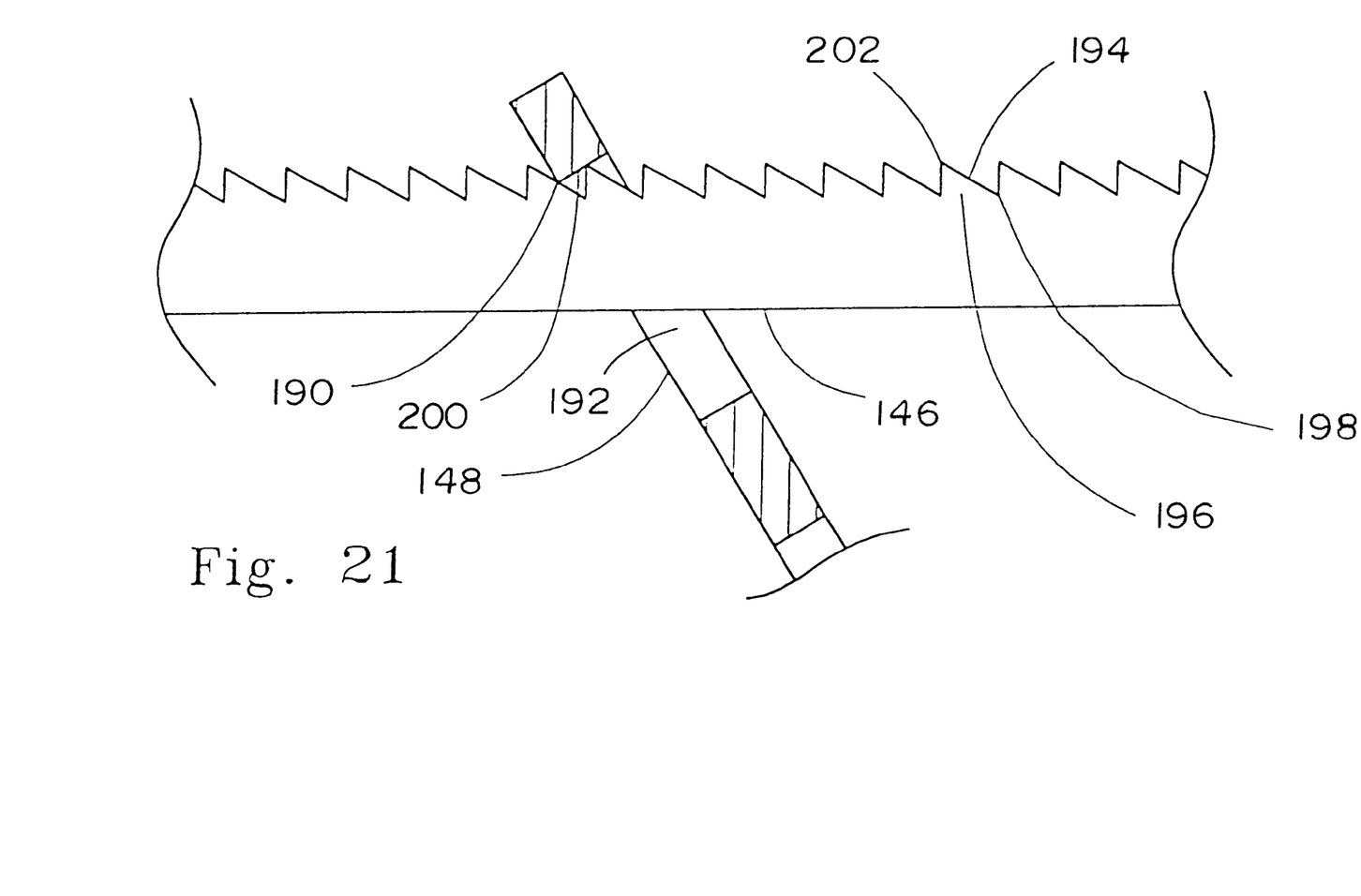
FIG. 21 is a partial enlarged view of a portion of the pawl and ratchet mechanism of the heated confectionary dispenser shown in FIG. 11.

When trigger 46 is pulled, pawl 148 is pulled down ramp 194 to notch 198 until the upper wall 200 of aperture 192 contacts the peak 202 of the adjacent tooth 196, causing pawl 148 to advance ratchet bar 146 (best shown in FIG. 21).

When trigger 46 is released its position is reversed by spring 86 which is stronger than rotary spring 153. Releasing the trigger causes the pawl 148 to back off from adjacent peak 202 and ride up ramp 194 until it drops over the next adjacent peak 202 and so on. This action continues until either trigger 46 is pulled again or pawl 148 comes to rest against back guide member 156. This type of pawl-ratchet mechanism is well known and is used primarily in caulking guns.

As above, a tension spring 86 biases trigger 46 into the at rest position. Spring 86 is held in position with handle post 88 and trigger post 90. In the at rest position trigger 46 rests against at rest post 92.

A front guide member 154 and a back guide member 156 are molded into body 132. Each guide member has an aperture 158 and 160 formed therein for receiving elongate ratchet bar 146.

A cartridge extension 162 has an internal channel 164 and external threads 166. External threads 166 of cartridge extension 162 engage internal threads 54 of tip 44. An O-ring 168 is positioned at the inlet of cartridge extension 162 to seal the cartridge exit opening 144 when it is positioned therein. Cartridge extension 162 has an exit opening 169. As above compression spring 62 biases ball 60 into a closed position against exit opening 169.

Heater 135 includes a heater body 170 with an elongate partial heating jacket 172 for receiving cartridge 140. As above, heater body 170 has an internal threaded portion 76 for engaging the external threading 52 of tip 44. Heater body 170 has a cavity 78 for receiving heater element 74. Heater element 74 may be an electric cartridge heater that is press fitted into cavity 78. Heater element 74 is electrically connected to electric cord 80. Note that for certain applications the heater 135 need not be used. Thus the user could remove heater element 74 or not connect electric cord 80 to an electrical outlet.

Confectionary cartridge 140 has a cap 174 that can be initially attached at exit opening 144. Cap 174 can be used to cover exit opening 144 and store the confectionary cartridge 140 in the event that the confectionary is not used in one sitting.

Figure 16:
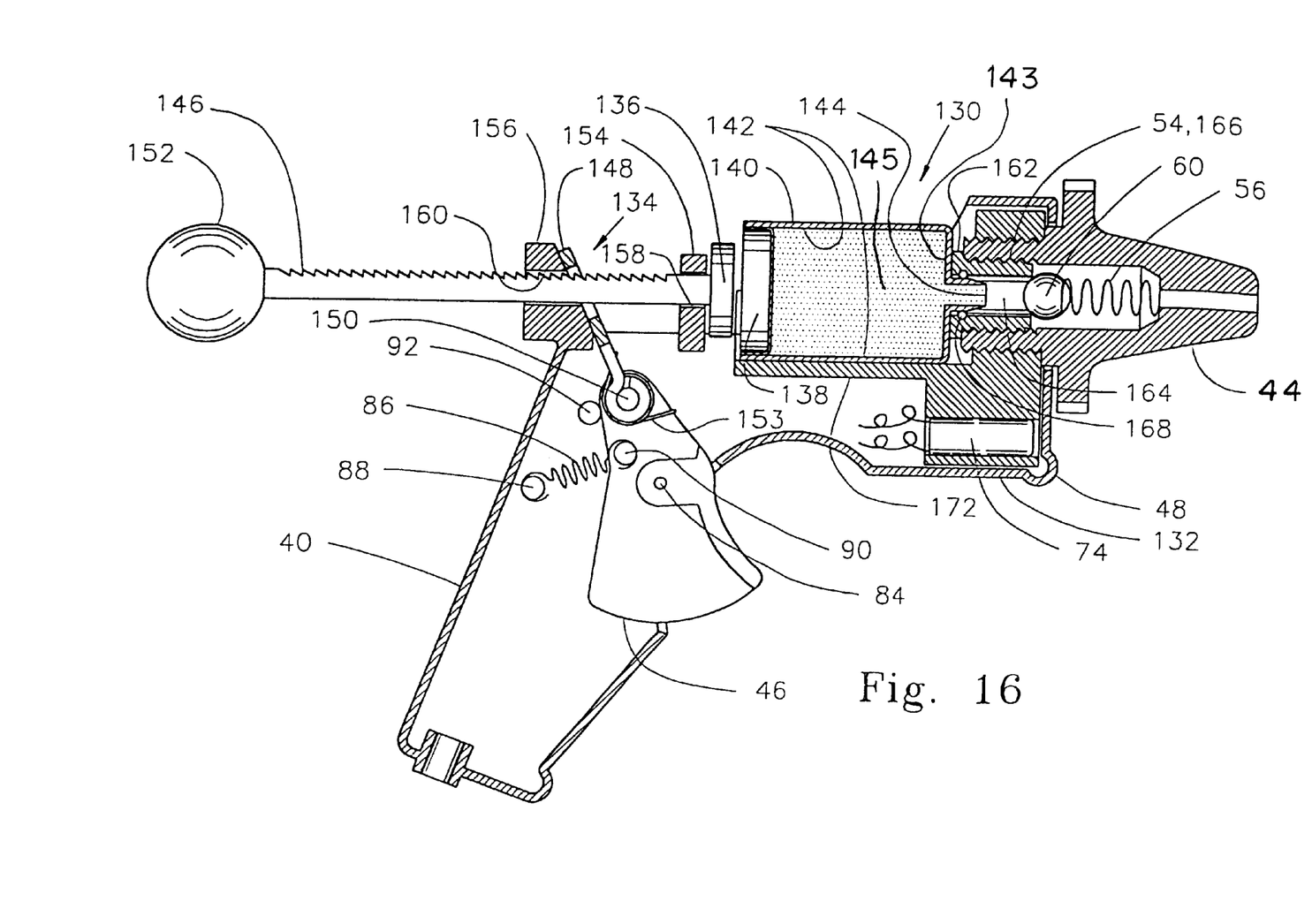
FIG. 16 is a longitudinal sectional view of the heated confectionary dispenser shown in FIG. 11 showing the feeder mechanism in the load position.
Figure 17:
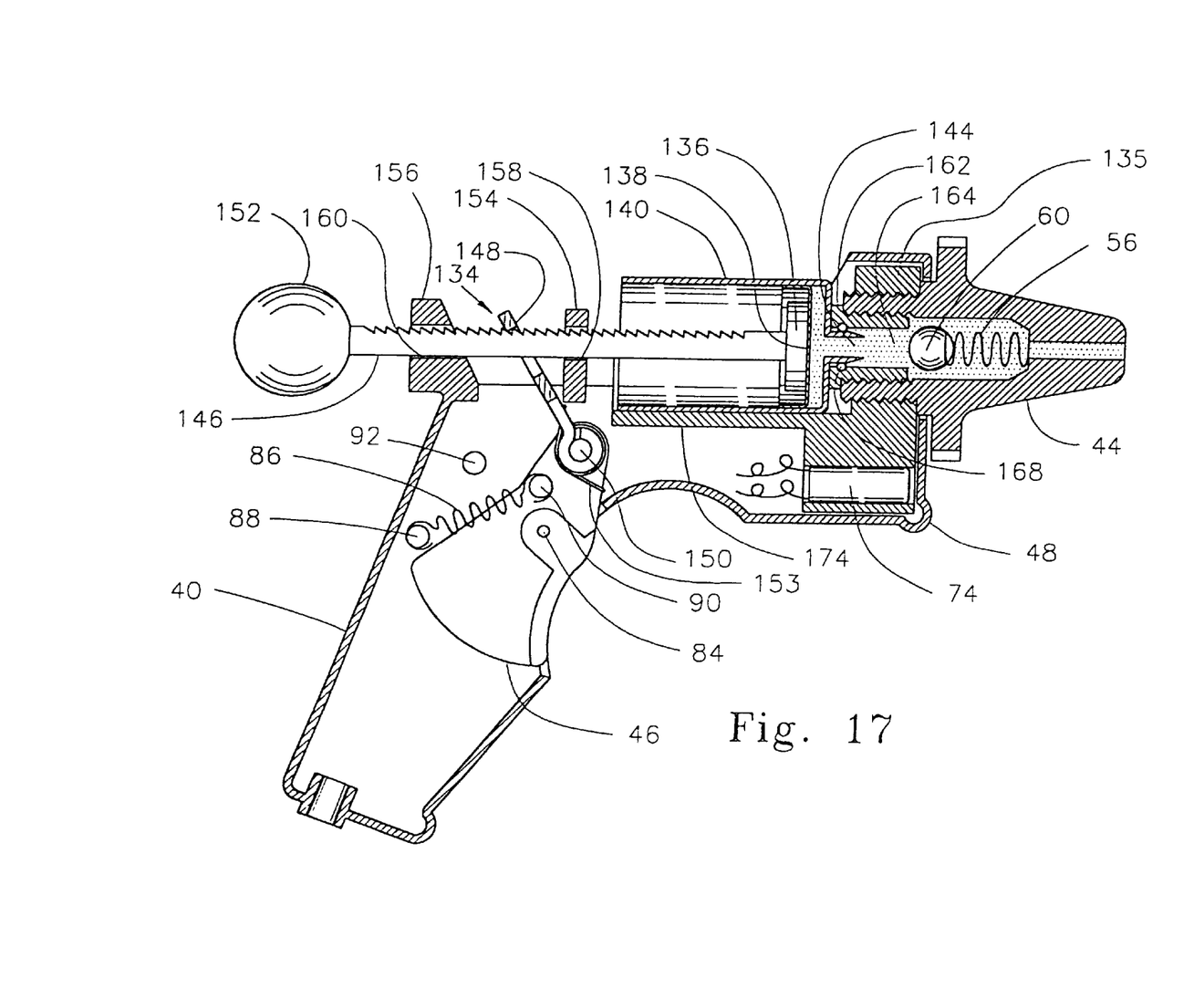
FIG. 17 is a longitudinal sectional view of the heated confectionary dispenser shown in FIG. 11 showing the feed mechanism at the end position.
Figure 18:
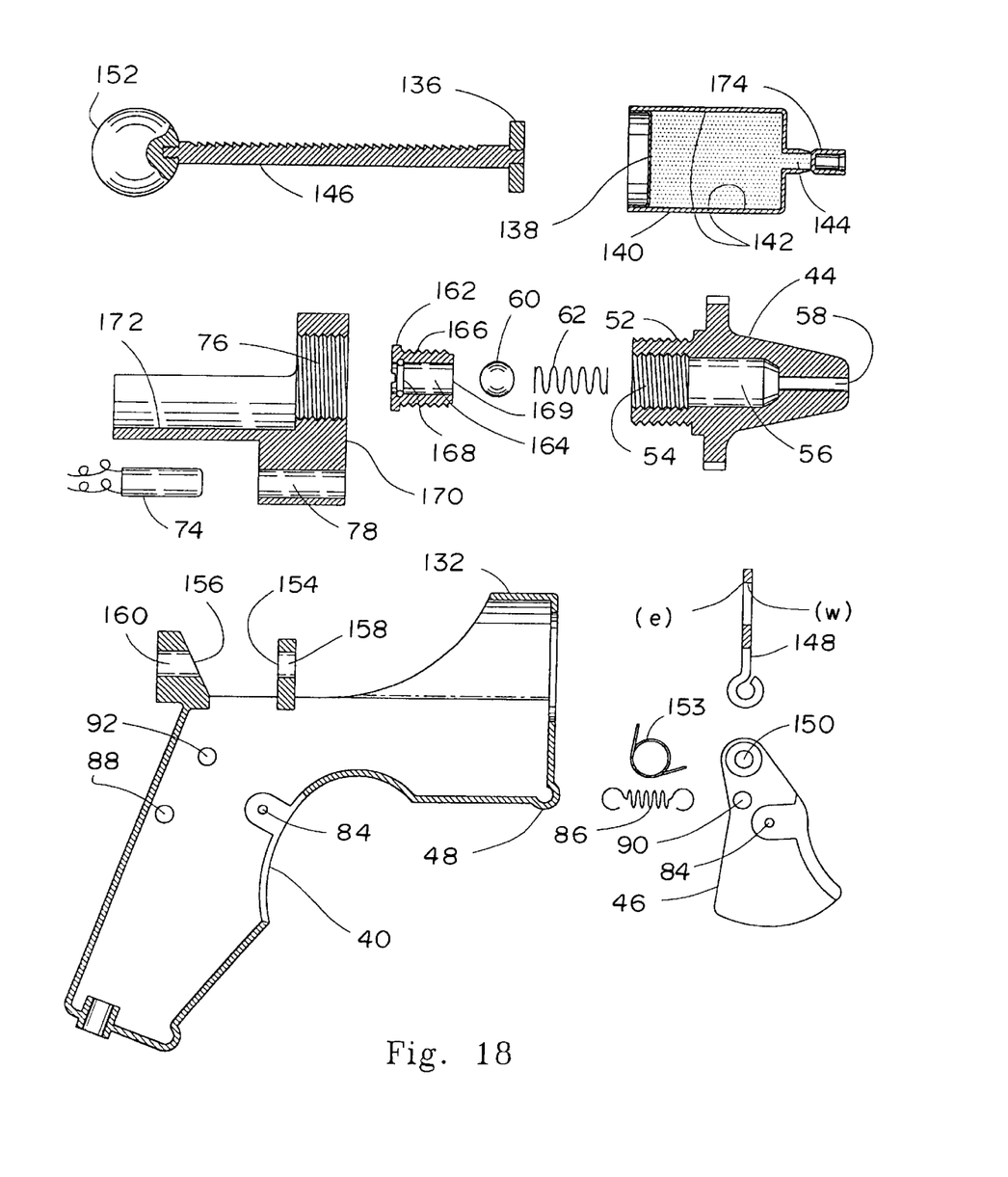
FIG. 18 is an exploded sectional view of the heated confectionary dispenser shown in FIG. 11.

In use confectionary cartridge 140 is inserted into the back of dispenser 130 and into the feeder mechanism 134. Cartridge 140 is placed on elongate partial heating jacket 172 and exit opening 144 is inserted into cartridge extension 162 and O-ring 168 provides a seal therebetween. The user would then squeeze the trigger 46 as shown in FIGS. 16 and 17. This would cause pawl 148 to engage elongate metal ratchet bar 146 and to move forwardly thus pushing plunger 136 against moveable base 138 of cartridge 140. The confectionary in cartridge 140 is thus pushed forwardly into cartridge extension 162. The pawl 148 continues to move forwardly to the end of the stroke. Trigger 46 is then released which causes pawl 148 to disengage the elongate ratchet bar 146 and allows spring 86 to move the trigger back into the at rest position. As the confectionary is heated by heater 135 it becomes molten and therefore the force required to push confectionary forward will be reduced. As above, molten confectionary is then pushed through exit opening 68 forcing ball 60 to move forwardly and compress compression spring 62. Molten confectionary will also be pushed out of tip 44 through exit opening 58. When confectionary is no longer being pushed forwardly the compression spring 62 will move the ball 60 backwardly to seal cartridge extension exit opening 169. Trigger 46 is squeezed as needed to force confectionary through tip 44.

Confectionary dispenser 130 can be easily assembled and disassembled to facilitate cleaning. Knob 152 is pulled backwardly to pull elongate ratchet bar 146 and plunger 136 so that plunger 136 is no longer inside cartridge 140. Confectionary cartridge 140 is then removed. Tip 44 is unscrewed and removed. Cartridge extension 162 is unscrewed and removed. Ball 60 and compression spring 62 are removed from tip 44. The process is reversed to assemble confectionary dispenser 130.

Figures 19, 20:
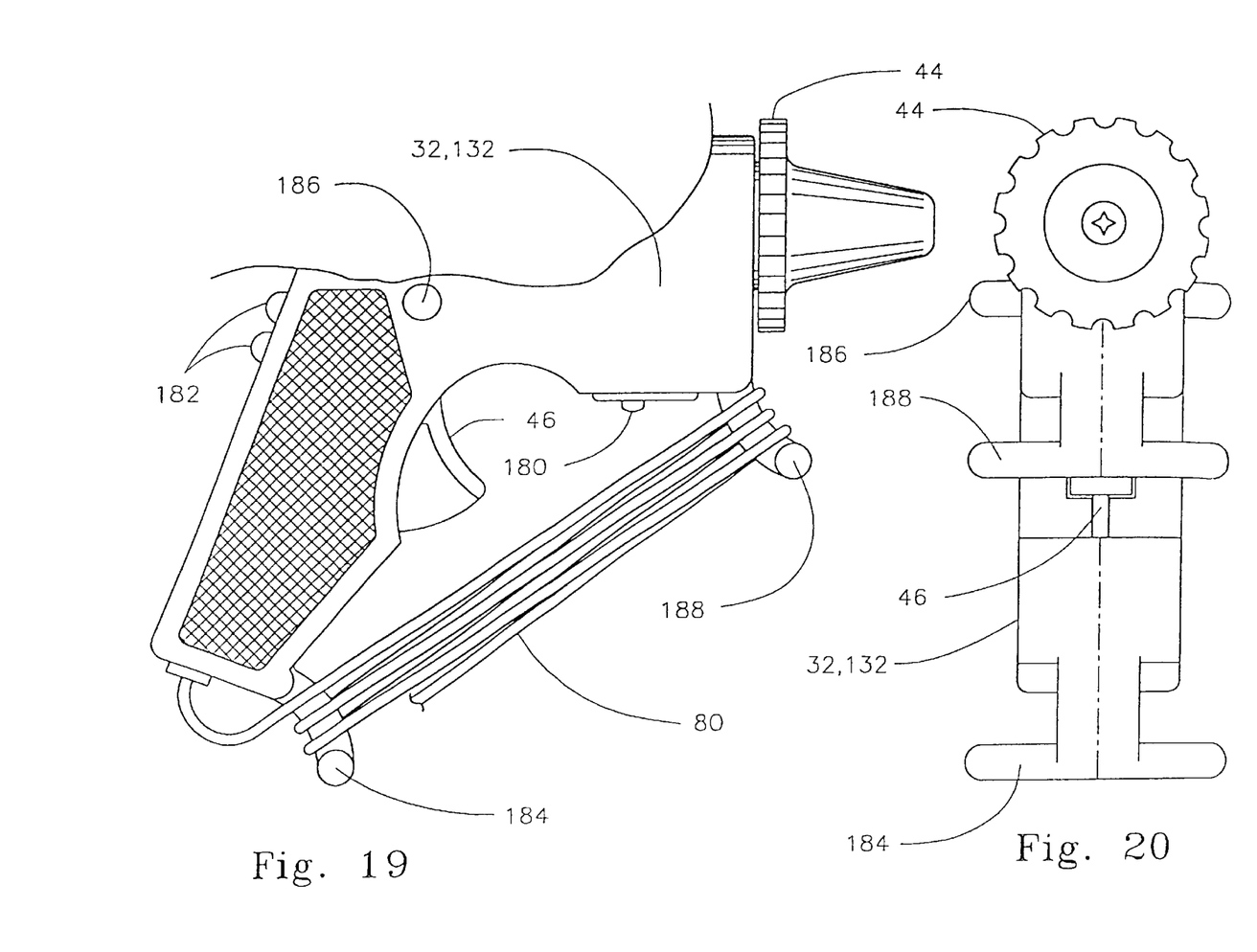
FIG. 19 is a partial side view of another alternate embodiment of the heated confectionary dispenser showing a pair of hooks for winding the cord.
FIG. 20 is an end view of the heated confectionary dispenser shown in FIG. 19.

It will be appreciated by those skilled in the art that there are a number of variations that may be incorporated into the confectionary dispensers described above. FIGS. 19 and 20 show at least some of the variations that may be incorporated into the confectionary dispensers. An on/off switch 180 may be incorporated so that user may leave the dispenser plugged in but control whether it is working by the switch. Alternatively switch 180 can have a plurality of settings such as high, medium and low or sliding type switch that has a variety of settings. One or more LED 182 (light emitting diode) may be incorporated into the heating circuit to indicate when the dispenser is on. Support feet 184, 186 and 188 extending outwardly from one end of the handle, from the middle of the body and from the tip end of the body respectively, such that the dispenser may be stood upright or on its side. In addition, feet 184 and 188 may be used to store the cord 80.

With reference to a confectionary stick 119 for use with a confectionary dispenser described above the confectionary may be a chocolate, a chocolate product, a chocolate type confectionery or other confectionery. Preferably the melting point of the confectionary is between 38° C. and 40° C. Preferably the confectionary stick has a hardness, density and straightness similar to glue sticks, sustainable when stored at normal room temperatures. Preferably the gumminess and the tackiness of confectionary stick is minimized. Preferably the confectionary stick is resistant to shattering or breaking if dropped or struck. Preferably the brittleness and tackiness of the confectionary stick is minimized. Preferably the stick can withstand normal handling and will not melt or deform when handled at reasonable skin temperature and reasonable pressure. Preferably the stick is more plastic. Preferably, after the confectionary stick has been heated in the dispenser and extruded therefrom, the confectionary has a rapid cool and set time. Preferably the cooled confectionary retains its desired shape and form, tastes like its intended flavor, retains its flavor and retains its color. Preferably the crumbling of the confectionary upon cooling is minimized.

It will be appreciated by those skilled in the art that the confectionary stick may be manufactured in a form other than a stick form. For example the have a specific predetermined shape that corresponds with the shape of the feeder mechanism.

Similarly with reference to a confectionary cartridge for use with a confectionary dispenser described above the confectionary may be a chocolate, a chocolate type confectionery or other confectionery. The confectionary cartridge may be manufactured and sold with confectionary therein or the confectionary cartridge may be sold empty for the user to reuse and make a confectionary and fill on an as needed basis. The ingredients may vary so that the prepackaged confectionary cartridges will have an acceptable shelf life. The characteristics of the confectionary may vary widely from a confectionary with characteristics that are similar to the confectionary described above with regard to the confectionary stick to a confectionary that does not require heat to facilitate flow through the dispenser.

There are a number of different options with regard to confectionary that may be used with the cartridge and they are as follows:

Options A: A base that consists of a ratio of approximately 3:1 of chocolate to vegetable oil such as CPK ingredients: Hydrogenated modified palm kernel oil, hydrogenated palm kernel oil, lecithin, sorbitian monosterate 60, and or hydrogenated coconut oil or both in combination. A certain amount of variance is permitted while still producing a suitable decorative caulking material.

Option B: A package rolled chocolate flavored fondant (described below). Note that a fondant on its own would be suitable, but, the addition of chocolate gives the end result of a more chocolate taste and a more desirable mouth feel. A certain amount of variance in the ratio of chocolate to fondant is permitted while still producing a suitable decorative caulking material.

Option C: Combining Option A+B at a 1:1 ratio with the addition of Gum Karaya. Therefore a formulation of 1 oz of Option A and 1 oz of Option B and 1/16 tsp Gum Karaya will produce a suitable decorative caulking material. A certain amount of variance is permitted while still producing suitable decorative caulking material.

Option D: Combination of a 50/50 Chocolate coating (described below) to Wilton™ Rolled Fondant. The 1:1 ratio produces an extremely pliable and rich tasting decorative caulking material produce a suitable decorative caulking material.

There are a number of different options with regard to confectionary that may be used with the confectionary stick, the following is one such option. First combine 50% of Formula B with 50% of a melted chocolate confectionery coating. Knead together the coating mixture with the icing sugar mixture until both mixtures are thoroughly incorporated into each other. Then form or extrude to desired size and shape. Once set, the resulting product is ridged but not brittle, when handled not tacky. Increasing amount of manual handling can cause the product to loose its shape, but can be reformed and then left to set and will retain original properties.

The chocolate may be semisweet chocolate, dark chocolate, white chocolate, flavored wafer compounds or chocolate chips.

Fondants are a saturated sugar solution in which small sugar crystals are dispersed. The sugar is in various degrees of crystallization. The rolled fondant is very pliable with a long shelf life, but hardens and retains its form when exposed to air.

There are a number of fondant recipes that are readily available and following is one that is found in the Good Housekeeping Illustrate Cookbook (Hearst Books, New York, N.Y., 1980). Mix 4 cups sugar; ¼ cup light corn syrup; ¼ teaspoon cream of tartar; ⅛ teaspoon salt; 1 cup water; and flavoring and color.

Alternatively a ready to use fondant such as Wilton™ Enterprises Rolled Fondant may be used. It contains the following ingredients: sugar, hydrogenated vegetable oil, Glucose syrup, Water, cocoa power, Glycerine, Glycerol monosterate, Caroxymethycellulose, Citric acid. The Pure White Rolled Fondant ingredients are sugar, Glucose syrup, hydrogenated vegetable oil, Water Glycerine, Corn starch, Gum Tragacanth, carboxymethycellulose, Artificial vanilla flavor, Sodium acetate acidic acid.

There are a number of chocolate coating recipes that are readily available and following is one that is found in the Good Housekeeping Illustrate Cookbook (Hearst Books, New York, N.Y., 1980). Mix 12 oz semi sweet chocolate pieces; ¼ cup butter or margarine; and ¼ cup light corn syrup. 50% CPK+50% hydrogenated coconut oil may be substituted for butter.

Generally the ingredients that may be used in the confectionary stick or the confectionary cartridge are as follows:

chocolate liquor; and/or cocoa power; and/or

Hydrogenated coconut oil, (Brand name Kokoheart 41 with a melting point of 40° C. to 43° C., or Brand name Kokoheart 37 melting point of 34° C. to 37° C.,) and/or CPK (Hydrogenated modified palm kernel oil, hydrogenated palm kernel oil, sorbitan, monsterate, polysorbate 60 lecithin,);

sugar; and/or glucose; and/or invert sugar; and/or white corn syrup, soya lecithin, glycerine, glycerol monsterate, carboxymethycellulose, and/or citric acid; and/or cream of tartar; and/or gum karyaya; and/or guar gum; and/or BHT (butylated hydroxytoluene); and/or corn starch; and/or Gum Tragacanth; and/or Lanolin; and/or Monoacetic acid; and/or Mono and diglycerides; and/or gelatin; and/or Polyglycerol esters of interesterfied castor oil fatty acids; and/or Polyoxethylene (20) Sorbitan monostearate; and/or Sorbitan monostearte; and/or Sorbitan tristerate; and/or Canedlilla wax; and/or Canauba wax, and/or Lecithin; and/or Lactylic Esters of Fatty Acids; and/or natural and artificial flavors and colors.

EXAMPLES

Following are some examples of recipes that have been used in regard to the above-mentioned invention.

Example 1
Chocolate Caulking

| INGREDIENTS | QUANTITY | |
|---|---|---|
| | GRAMS | PERCENT |
| Chocolate confectionery Coating | 350.00 | 77.778 |
| Corn Syrup (Crown, white) | 50.00 | 11.110 |
| Kokoheart 41 ™ shortening** | 25.00 | 5.556 |
| Butter** | 25.00 | 5.556 |
| TOTAL | 450.00 | 100.00 |

Procedure
1. Melt together, Chocolate confectionery coating, butter, and/or Kokoheart with corn syrup. Once chocolate confectionery coating is melted, remove from heat, mix until smooth and blended. Cool. Fill caulking containers.
**Ingredient Substitution-numerous shortenings, butters singularly used or in combination will produce suitable Chocolate Confectionery caulking compound as long as the percentage does not exceed a total of 20%.

Procedure
1. Melt together, Chocolate confectionery coating, butter and/or Kokoheart with corn syrup. Once chocolate confectionery coating is melted, remove from heat, mix until smooth and blended. Cool. Fill caulking containers.
** Ingredient Substitution-numerous shortenings, butters singularly used or in combination will produce a suitable Chocolate Confectionery caulking compound as long as the percentage does not exceed a total of 20%.

Example 2
Chocolate Caulking

| INGREDIENTS | QUANTITY | |
|---|---|---|
| | GRAMS | PERCENT |
| Sugar, powdered, icing | 250.00 | 50.000 |
| Water (60 C. 140 F.) | 55.00 | 11.000 |
| Kokoheart 41 ™ (shortening)* | 51.68 | 10.336 |
| Corn Syrup (Crown, white) | 45.00 | 9.000 |
| Cocoa (Bensdor, Lecithynated 10/12%) | 35.00 | 7.000 |
| Glucose (Wilton) | 30.00 | 6.000 |
| Sugar, refined granular | 20.00 | 4.000 |
| Kelgum, Xanthan Gum Blend | 7.40 | 1.480 |
| Sorbitan monostearate emulsifier, Glycospeise, S20KFG | 2.50 | 0.500 |
| Sorbitan tristearate emulsifier, TS20KF5 | 1.67 | 0.334 |
| Salt, table | 1.25 | 0.250 |
| Lecithin, Yelkin SS | 0.500 | 0.100 |
| Total | 500.0 | 100.00 |

Procedure
1. Cream shortening and cocoa together until just mixed, using Kitchenaid or Hobart mixer.
2. Mix Sorbitan monostearate and sorbitan tristearate, heat gently until melted and add to warm shortening cocoa blend.
3. Blend corn syrup, glucose, lecithin and salt. Add to above mixture and keep warm, approximately 39° C. (110° F.).
4. Blend 5.0 G of granular sugar with Kelgum and add to water. After Kelgum is Hydrated, add remaining granular sugar (15 g), heat to approximately 60° C. (140° F.) and add to above blend. Mix on low setting for 30 seconds. Scrape down sides and increase to medium speed for an additional 2 ½ minutes.
5. Maintain temperature at approximately 38° C. (100° F.) and add powdered sugar slowly while continuing to mix at low speed. After all of the sugar has been added, mix until product is smooth in appearance.

Example 3
Chocolate Sticks

| INGREDIENTS | PERCENT |
|---|---|
| Sugar, powdered, icing | 33.000 |
| Chocolate Confectionery Coating | 26.449 |
| Corn syrup (Crown, white) | 9.716 |
| Kokoheart 41* | 8.710 |
| Water (60° C. 140° F.) | 7.260 |
| Cocoa (Gerkin, Lecithynated 10/12%) | 4.620 |
| Glucose (Wilton) | 3.960 |
| Sugar, refined granular | 2.640 |
| Butter** | 1.889 |
| Kelgum, Xanthan Gum Blend | 0.997 |
| Sorbitan monostearate emulsifier, Glycospeise, S20KFG | 0.330 |
| Sorbitan tristearate emulsifier, TS20KF5 | 0.220 |
| Salt, table | 0.145 |
| Lecithin, Yelkin SS | 0.066 |
| Total | 100.000 |

**Item substitution-Numerous ingredients can be substituted by other ingredients with similar properties and characteristics based on the following factors:

scale up of production when manufacturing
economics of products available and feasibility at time of manufacturing ensuring a marketable product
Example: Butter can be replaced by the same amount of Kokoheart 41™ shortening. Ingredient variance: Solid ingredients-2%–5%, excluding additives and stabilizers such as Kelgum
Procedure
1. Melt together in a double boiler, 26.44% Chocolate confectionery coating, 1.889% butter, 1.889% Kokoheart 41, 3.776% corn syrup. Once chocolate confectionery coating is melted, remove from heat, mix until smooth and blended. Cool until pliable and pleasant to handle.
2. Cream 6.823% Kokoheart 41, and 4.620% cocoa together until just mixed, using Kitchenaid or Hobart mixer.
3. Mix Sorbitan monostearate and sorbitan tristearate, heat gently until melted and add to warm shortening cocoa blend.
4. Blend 5.940% corn syrup, glucose, lecithin and salt. Add to above mixture and keep warm, approximately 39° C. (110° F.).
5. Blend half of granular sugar with Kelgum and add to water. After Kelgum is Hydrated add remaining granular sugar, heat to approximately 60° C. (140° F.) and add to above blend. Mix on low setting for 30 seconds. Scrape down sides and increase to medium speed for an additional 2 ½ minutes.
6. Add powdered sugar slowly while continuing to mix at low speed. Mixture should form a ball, or dough like consistency.
7. Knead together the coating mixture with the icing sugar mixture until both mixtures are thoroughly incorporated into each other.
8. Form or extrude to desired size and shape. Once set, ridged but not brittle, when handled not tacky. Increasing amount of manual handling can cause the product to loose its shape, but can be reformed and then left to set and will retain original properties. Retains desired decorated forms as extruded. Quick setting time.

Example 4
Chocolate Sticks

| INGREDIENTS | | Grams | PERCENT |
|---|---|---|---|
| Chocolate Confectionery Coating | | 194.445 | 38.889 |
| Sugar, powdered, icing | | 125.000 | 25.000 |
| Kokoheart 41* | 27.78 + 25.84 = | 53.620 | 10.724 |
| Corn Syrup (Crown, white) | 27.78 + 22.52 = | 50.300 | 10.060 |
| Water (60 C. 140 F.) | | 27.500 | 5.5000 |
| Cocoa (Gerkin, Lecithynated 10/12%) | | 17.500 | 3.500 |
| Glucose (Wilton) | | 15.000 | 3.000 |
| Sugar, refined granular | | 10.000 | 2.000 |
| Kelgum, Xanthan Gum Blend | | 3.700 | 0.740 |
| Sorbitan monostearate emulsifier, Glycospeise, S20KFG | | 1.250 | 0.250 |
| Sorbitan tristearate emulsifier, TS20KF5 | | 0.835 | 0.167 |
| Salt, table | | 0.600 | 0.120 |
| Lecithin, Yelkin SS | | 0.250 | 0.050 |
| Total | | 500.000 | 100.000 |

**Item substitution-Numerous ingredients can be substituted by other ingredients with similar properties and characteristics based on the following factors:
• scale up of production when manufacturing,
• economics of products available and feasability at time of manufacturing
• economics of products available and feasability at time of manufacturing
• ensuring a marketable product scale up of production when manufacturing,
economics of products available and feasibility at time of manufacturing economics of products available and feasibility at time of manufacturing
ensuring a marketable product
Example: Butter can be replaced by the same amount of Kokoheart 41 shortening Ingredient variance: Solid ingredients-2%–5%, excluding additives and stabilizers such as Kelgum
Procedure:
1. Melt together in a double boiler, 194.445 g Chocolate confectionery coating, 27.780 g Kokoheart 41, 27.780 g corn syrup. Once chocolate confectionery coating is melted, remove from heat, mix until smooth and blended. Cool until pliable and pleasant to handle.
2. Cream 25.84 g Kokoheart 41, and 17.5 g cocoa together until just mixed, using Kitchenaid or Hobart mixer.
3. Mix Sorbitan monostearatel 25 g and sorbitan tristearate 0.835 g, heat gently until melted and add to warm shortening cocoa blend.
4. Blend 22.52 g corn syrup, 15.0 g glucose, 0.25 g lecithin and 0.625 g salt. Add to above mixture and keep warm, approximately 39° C. (110° F.).
5. Blend half of granular sugar (5 g) with 3.7 g Kelgum and add to 27.5 g water. After Kelgum is hydrated, add remaining granular sugar (5 g), heat to approximately 60° C. (140° F.) and add to above blend. Mix on low setting for 30 seconds. Scrape down sides and increase to medium speed for an additional 2 ½ minutes.
6. Add 125.00 g powdered sugar slowly while continuity to mix at low speed. Mixture should form a ball, or dough like consistency.
7. Mix together the coating mixture with the icing sugar mixture until both mixtures are thoroughly incorporated with each other.
8. Smooth plasticine like consistency, too limp using this procedure for chocolate sticks, but would be suitable for chocolate caulking compound.

Formulations were recreated using the simplest of equipment. Within a sophisticated lab environment results may be different. Generally the melting point for extrusion for decorating purposes is 99–107° F. allowance for range due to consideration of ingredient substitutions and ingredient variance.

It will be appreciated that the above description relates to the invention by way of example only. Many variations on the invention will be obvious to those skilled in the art and such obvious variations are within the scope of the invention as described herein whether or not expressly described.

What is claimed as the Invention is:

1. A confectionary dispenser for use in association with a confectionary comprising:
   a body;
   a trigger movably attached to the body having an at rest position and an end of stroke position;
   a removable internal channel removably attached to the body, the removable internal channel having an exit opening and being adapted to receive the confectionary;
   a source of confectionary insertable Into the removable Internal channel; and
   a feeder mechanism operably attached to the trigger for operably advancing the confectionary into the removable internal channel when the trigger Is moved from the at rest position towards the end of stroke position.

2. A confectionary dispenser as claimed in claim 1 further including a cartridge having a movable base and a cartridge exit opening, the cartridge being adapted to receive the confectionary and being releasably attachable to the body such that the cartridge exit opening is in flow communication with the removable internal channel and wherein the feeder mechanism includes a plunger operably attached to the trigger such that moving the trigger from the at rest position towards the end of stroke position moves the plunger into engagement with the movable base, causing the movable base to move towards the cartridge exit opening and causing the confection to move into the removable internal channel.

3. A confectionary dispenser as claimed in claim 1 further including a means for controlling the confectionary that is extruded from the channel at the exit opening.

4. A confectionary dispenser as claimed in claim 3 further including a heater attached to the body adapted to heat the confectionary in the removable internal channel.

5. A confectionary dispenser as claimed in claim 4 wherein the heater is situated proximate to the exit opening of the internal channel.

6. A confectionary dispenser as claimed in claim 5 wherein the controlling means is a valve.

7. A confectionary dispenser as claimed in claim 6 wherein the confectionary has an elongate rod shape at standard temperature and pressure and wherein the feeder mechanism includes a feeder/gripper assembly including a sliding feeder/gripper and a claw pivotally attached to the sliding feeder/gripper and releasably operably engagable to the trigger wherein moving the trigger from the at rest position towards the end of stroke position causes the claw to engage the confectionary and causes the confectionary to move into the removable internal channel.

8. A confectionary dispenser as claimed in claim 7 wherein the valve is a ball and compression spring positioned in a tip internal channel of the tip, wherein the tip internal channel is in flow communication with the removable internal channel and the tip exit opening and, in the at rest position, the ball seals the exit opening of the removable internal channel.

9. A confectionary dispenser as claimed in claim 6 further including a tip removably attached to the removable internal channel having a predetermined shape of a tip exit opening.

10. A confectionary dispenser as claimed in claim 9 further including a feeder/gripper retaining cover releasably attached to the body and covering the feeder/gripper assembly when it is in an at rest position.

11. A confectionary dispenser as claimed in claim 9 further including a cartridge having a movable base and a cartridge exit opening, the cartridge being adapted to receive the confectionary and being releasably attachable to the body such that the cartridge exit opening is in flow communication with the removable internal channel and wherein the feeder mechanism includes a plunger operably attached to the trigger such that moving the trigger from the at rest position towards the end of stroke position moves the plunger into engagement with the movable base, causing the movable base to move towards the cartridge exit opening and causing the confection to move into the removable internal channel.

12. A confectionary dispenser as claimed in claim 11 further including a ratchet type mechanism for advancing the plunger into the cartridge.

13. A confectionary dispenser as claimed in claim 12 wherein the valve is a ball and compression spring positioned in a tip internal channel of the tip, wherein the tip internal channel is in flow communication with the removable internal channel and the tip exit opening and in the at rest position the ball seals the exit opening of the removable internal channel.

* * * * *